Sept. 16, 1952  E. JONES  2,611,033
SYNCHRONIZING SYSTEM
Filed Aug. 13, 1949
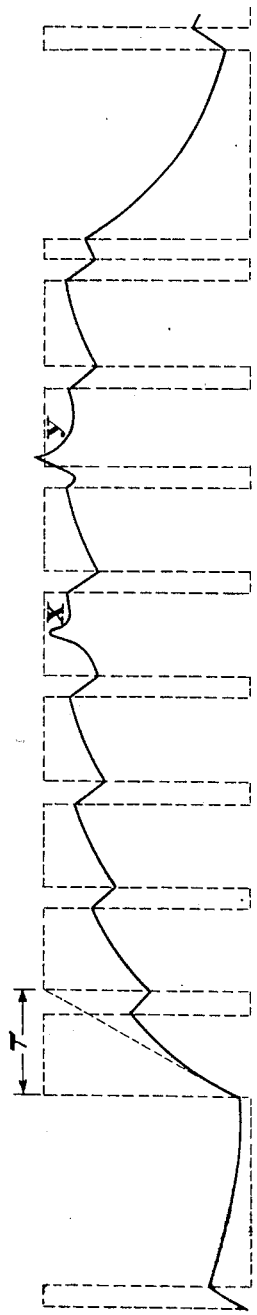
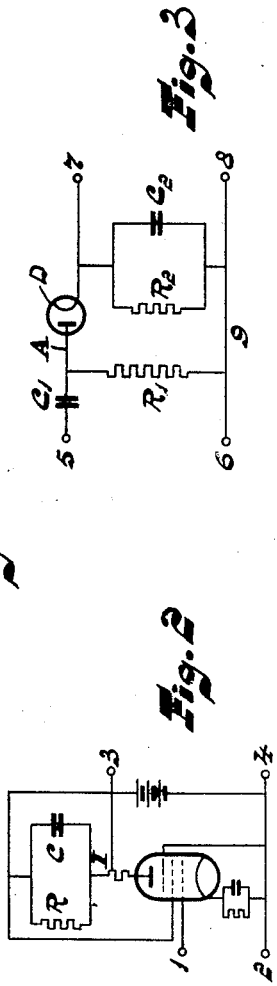
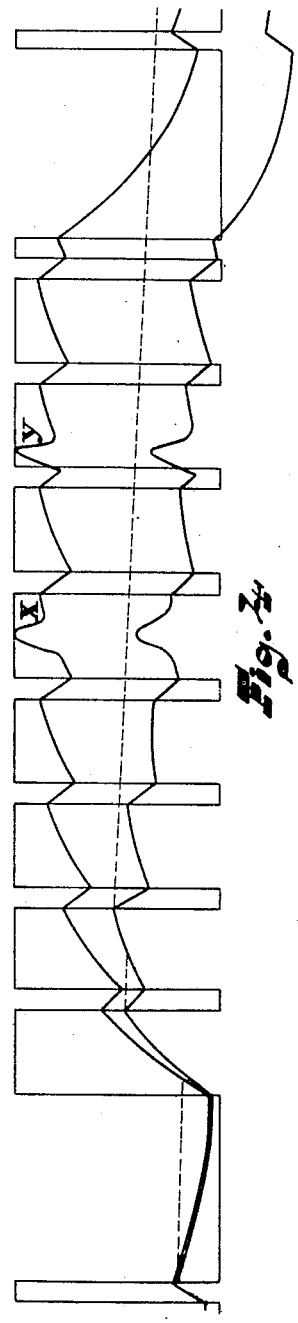
INVENTOR.
EMLYN JONES
BY Fred M. Vogel
AGENT

UNITED STATES PATENT OFFICE 2,611,033

SYNCHRONIZING SYSTEM

Emlyn Jones, Salfords, near Redhill, England, assignor to Hartford National Bank and Trust Company, Hartford, Conn., as trustee Application August 13, 1949, Serial No. 110,150
In Great Britain August 16, 1948

3 Claims. (Cl. 178—69.5)

The invention relates to television receivers and is particularly concerned with frame synchronising circuit arrangements.

In order to prevent objectionable vertical movements of the picture, and in particular to ensure an accurate interlace in those systems of scanning referred to as "odd line interlacing" it is essential that the vertical scanning waveform should be repeated accurately during each cycle of operation.

It is well known that, to achieve this, the instant of conduction of the gas discharge valve, blocking oscillator, or other device (hereinafter called the discharge device), which may be used to produce the return stroke of the vertical (or frame) scanning waveform generator, should occur after a fixed period of time from the commencement of the vertical synchronising pulse. It is not so well known that even when this has been achieved the scanning waveform is often made irregular by variations in the amplitude of the vertical return stroke from cycle to cycle. These variations may be caused by the presence of spurious signals in the synchronising wave applied to the discharge device which signals may be produced in the television receiver itself, for example, by the horizontal scanning system, or they may be present in the incoming signal, for example, atmospheric disturbances. As an example, it is known that the anode voltage at which a gas discharge valve de-ionises depends on the voltage present on its grid at the instant of de-ionisation. Similarly the total quantity of electricity drawn from the charging condenser by a blocking oscillator valve depends upon the potentials applied to its grid during the period of conduction.

It is the object of the present invention so to modify the waveform of the vertical (or frame) synchronising pulse before it is applied to the discharge device that the maximum potential occurs at a substantially fixed instant of time after the commencement of the vertical synchronising pulse, and, for a period of time thereafter, during which the discharge device is performing its functions, interfering signals (when such are present) are wholly or in part removed from the said pulse.

According to the invention a television frame synchronising circuit comprises a unidirectional conducting device, for example a diode, to which the frame synchronising pulses are supplied and which has included in its input circuit a resistance-capacity network having such a time constant that the maximum amplitude of the voltage applied to the said device to cause conduction thereof occurs near the commencement of the pulse.

In order to prevent interfering signals from reaching the discharge device during its operation the output circuit of the unidirectional conducting device, is, in accordance with a further feature of the invention, associated with a second resistance-capacity network having such a time constant that the said device is rendered non-conducting after the greatest voltage amplitude of a synchronising pulse has been applied to the input circuit thereof.

Further features of the invention will be apparent from the following description of one embodiment of the invention which is given by way of example only and with reference to the accompanying drawings, in which:

Figure 1 shows in full lines the general form of a frame synchronising pulse derived from the transmitted pulse.

Figure 2 shows a synchronising separator circuit,

Figure 3 shows a pulse responsive circuit according to the invention, and

Figure 4 shows graphically the waveform obtained at various points in the circuit of Figure 3.

Referring now to Figure 1 the dotted line shows the form of a transmitted synchronising pulse and the full line the general form of the frame synchronising pulse derived from the usual synchronising separator circuit. An example of such a circuit is shown in Figure 2 in which the combined line and frame pulses are supplied to the input terminals 1, 2 and the frame pulses appear at the output terminals 3, 4 the network R. C. forming a frequency selective network in which the product RC corresponds to the time T in Figure 1.

The derived synchronising pulse may have superimposed spurious impulses such as are shown at X and Y which interfere with the proper operation of the discharge device, and the shape of the pulse may also be slightly different from cycle to cycle due to interfering pulses produced in the receiver, as before described. It will be seen that in this example the pulse is so shaped that its greatest amplitude occurs near its end, whereas it is desirable to initiate the operation of the discharge device as soon as possible after the commencement of the said pulse. This example is chosen to illustrate the operation of the invention with a bad shape of pulse but this shape is not necessary or desirable for the operation of the invention.

In order to minimise the effects of spurious impulses such as X, Y, the output pulse of the separator is applied to the input terminal 5—6 of the circuit of Figure 3 and the discharge device is connected to terminals 7—8 of said circuit.

This circuit on its input side includes a resistance-capacity network $C_1R_1$ the junction of the resistor and the capacitor being connected to the anode of a thermionic diode rectifier D (the synchronising pulse under consideration being positive going) the cathode of which is connected through one pole 7 of the output circuit to the time base oscillator (not shown) which may be a gas discharge tube or a blocking oscillator or other discharge device of known form. The other end of the resistor $R_1$ is connected to the common lead 9 joining the input terminal 6 to the output terminal 8.

A second resistance-capacity network comprising resistor $R_2$ and capacitor $C_2$ is connected across the output terminals 7 and 8.

In the input circuit the time constant of the network $C_1R_1$ is so chosen in relation to the speed of rise of the pulse that the greatest amplitude of the voltage appearing at the anode A of the diode D is near the commencement of the pulse and the time constant of the network $C_2R_2$ is made greater than that of $C_1R_1$ while at the same time $R_2$ is made greater than $R_1$. By this means the diode D conducts when the voltage at A rises, that is, during the commencement of the pulse, so that current flows into the condenser $C_2$ and the potential at terminal 7 increases. After the greatest amplitude of voltage has appeared at A, the charge on condenser $C_1$ leaks away through $R_1$ at a faster rate than the charge on $C_2$ leaks away through $R_2$ so that the diode D remains non-conducting. The waveforms of voltage at points 5, A and 7 in Figure 3 will therefore be somewhat as those of Figure 4 wherein the upper full line indicates the synchronising pulse, the lower full line the waveform at the anode A and the dotted line the waveform at the ouput terminal 7. It will be seen that because the diode D is non-conducting over the greater portion of the pulse, spurious impulses and undesirable irregularities are wholly or partly removed from the pulse applied to discharge device.

Whereas in the foregoing explanation a thermionic diode has been assumed it will be apparent that any unidirectional conducting device such as a copper-oxide rectifier, silicon or germanium crystal rectifier etc. can be used instead. Also in the foregoing description the assumed pulse was positive whereas it is obvious that by reversing the connections to the diode or other device the invention will work in the same manner with a negative pulse.

In a preferred modification the diode or other unidirectional conducting device has applied to it an additional voltage bias, for example, by inserting a source of potential in series with $R_1$ or $R_2$ or by passing a steady current through them. The diode then remains non-conducting during the period between the vertical synchronising pulses so that interfering pulses which may occur during this time are also wholly or partly removed from the waveform at terminal 3.

What I claim is:

1. In a television frame synchronizing circuit, the combination comprising a unidirectional conductor having an input circuit comprising a first network including a first resistance element and a first capacitive element and having a first time constant and an output circuit comprising a second network including a second resistance element and a second capacitive element and having a second time constant, and means to apply a train of frame synchronizing pulses to said input circuit to increase the potential difference between said input circuit and said output circuit thereby to cause said unidirectional conductor to conduct and to charge said second capacitive element, the time constant of said first network having a value at which said conduction of said unidirectional conductor is produced substantially at the start of said train of frame synchronizing pulses, the time constants of said first and second networks having related values at which the discharge of said second capacitive element decreases the potential difference between said input and output circuits during the greater portion of the duration of said train of frame synchronizing pulses subsequent to the start of conduction of said unidirectional conductor thereby to prevent conduction of said unidirectional conductor during said greater portion.

2. In a television frame synchronizing circuit, the combination comprising a unidirectional conductor having an input circuit comprising a first network including a first resistance element and a first capacitive element and having a first time constant and an output circuit comprising a second network including a second resistance element and a second capacitive element and having a second time constant greater than said first time constant, the resistance value of said second resistance element being greater than the resistance value of said first resistance element, and means to apply a train of frame synchronizing pulses to said input circuit to increase the potential difference between said input circuit and said output circuit thereby to cause said unidirectional conductor to conduct and to charge said second capacitive element, the time constant of said first network having a value at which said conduction of said unidirectional conductor is produced substantially at the start of said train of frame synchronizing pulses, the time constants of said first and second networks having related values at which the discharge of said second capacitive element decreases the potential difference between said input and output circuits during the greater portion of the duration of said train of frame synchronizing pulses subsequent to the start of conduction of said unidirectional conductor thereby to prevent conduction of said undirectional conductor during said greater portion.

3. In a television frame synchronizing circuit, the combination comprising an electron discharge tube having cathode and anode electrodes, an input circuit coupled to said anode electrode and comprising a first network including a first resistance element and a first capacitive element and having a first time constant, an output circuit coupled to said cathode electrode and comprising a second network including a second resistance element and a second capacitive element and having a second time constant greater than said first time constant, and means to apply a train of frame synchronizing pulses to said input circuit to increase the potential difference between said input circuit and said output circuit thereby to cause said electron discharge tube to conduct and to charge said second capacitive element, the time constant of said first network having a value at which said conduction of said electron discharge tube is produced substantially at the start of said train of frame synchronizing pulses, the time constants of said first and second networks having related values at which the discharge of said second capacitive element decreases the potential difference between said input and output circuits during the greater portion of the duration of said train of frame synchronizing pulses subsequent to the start of conduction of said electron discharge tube thereby to prevent conduction of said electron discharge tube during said greater portion.

EMLYN JONES.

REFERENCES CITED

The following references are of record in the file of this patent:

UNITED STATES PATENTS

| Number | Name | Date |
|---|---|---|
| 2,218,067 | Faudell | Oct. 15, 1940 |
| 2,292,148 | Moe | Aug. 4, 1942 |
| 2,408,923 | Mautner | May 23, 1950 |